(12) United States Patent
Badhwar et al.

(10) Patent No.: US 11,290,464 B2
(45) Date of Patent: Mar. 29, 2022

(54) SYSTEMS AND METHODS FOR ADAPTIVE STEP-UP AUTHENTICATION

(71) Applicant: VOYA SERVICES COMPANY, Atlanta, GA (US)

(72) Inventors: Rajat P. Badhwar, Glastonbury, CT (US); Kennison Martin, Glastonbury, CT (US)

(73) Assignee: VOYA SERVICES COMPANY, Atlanta, GA (US)

( * ) Notice: Subject to any disclaimer, the term of this patent is extended or adjusted under 35 U.S.C. 154(b) by 210 days.

(21) Appl. No.: 16/719,560

(22) Filed: Dec. 18, 2019

(65) Prior Publication Data

US 2021/0194883 A1  Jun. 24, 2021

(51) Int. Cl.
*H04L 29/00* (2006.01)
*H04L 29/06* (2006.01)

(52) U.S. Cl.
CPC .......... *H04L 63/102* (2013.01); *H04L 63/083* (2013.01); *H04L 63/0876* (2013.01)

(58) Field of Classification Search
CPC ............... H04L 63/102; H04L 63/0838; H04L 63/0876; H04L 63/0861; H04L 63/107;
(Continued)

(56) References Cited

U.S. PATENT DOCUMENTS 9,516,010 B1 * 12/2016 Avital ................... H04L 63/083
10,097,527 B2 * 10/2018 Brown .................... H04L 63/20
(Continued)

OTHER PUBLICATIONS

Kurtto, Jesse. "The Difference Between SAML 2.0 and OAuth 2.0" Internet Source: https://www.ubisecure.com/uncategorized/difference-between-saml-and-oauth/. Published Jul. 3, 2017. 18 pages. (Year: 2017).*

(Continued)

*Primary Examiner* — Don G Zhao
(74) *Attorney, Agent, or Firm* — Fish & Richardson P.C.

(57) ABSTRACT

A computer-implemented method for enhancing security controls of a web application is described. The method includes, in response to a user device's request to access the web application during a current user session, collecting, by a server system, authentication data of a user of the user device from an identity provider; authenticating, by the server system, an identity of the user based on the collected authentication data; generating, for the user session, a user risk profile that characterizes a level of risk that the user's identity will be compromised; after the user risk profile has been generated for the current user session, authorizing the user device to access the web application; detecting that the user is attempting a particular action on the web application; in response to the detection of the particular action, determining whether a step-up authentication is required based on the user risk profile generated for the current user session; in response to a determination that a step-up authentication is required, dynamically selecting, based on the generated user risk profile, a step-up authentication method for re-authenticating the user's identity; and providing one or more security requests defined by the selected step-up authentication method to the user device.

18 Claims, 4 Drawing Sheets

(58) Field of Classification Search
CPC .............. H04L 63/083; H04L 63/0807; H04L 2463/082
See application file for complete search history.

(56) References Cited

U.S. PATENT DOCUMENTS

| | | | |
|---|---|---|---|
| 10,951,606 B1* | 3/2021 | Shahidzadeh | H04W 4/14 |
| 2012/0054057 A1* | 3/2012 | O'Connell | G06Q 30/0601 705/26.1 |
| 2015/0324783 A1* | 11/2015 | Desai | G06N 5/046 705/39 |
| 2016/0092176 A1* | 3/2016 | Straub | G06F 3/0486 717/107 |
| 2016/0092179 A1* | 3/2016 | Straub | G06F 8/20 717/107 |
| 2016/0092339 A1* | 3/2016 | Straub | H04L 67/10 717/124 |
| 2016/0092348 A1* | 3/2016 | Straub | G06F 8/61 717/124 |
| 2016/0105421 A1* | 4/2016 | Cashman | H04L 63/0815 726/8 |
| 2017/0041296 A1* | 2/2017 | Ford | G06F 16/951 |
| 2017/0046134 A1* | 2/2017 | Straub | G06F 8/31 |
| 2017/0046235 A1* | 2/2017 | Straub | G06F 8/35 |
| 2017/0048215 A1* | 2/2017 | Straub | H04L 63/06 |
| 2017/0048252 A1* | 2/2017 | Straub | H04L 67/06 |
| 2017/0048319 A1* | 2/2017 | Straub | H04L 67/2847 |
| 2017/0048339 A1* | 2/2017 | Straub | G06F 8/40 |
| 2017/0230363 A1* | 8/2017 | Deutschmann | H04W 12/065 |
| 2017/0257363 A1* | 9/2017 | Franke | H04W 12/068 |
| 2017/0346851 A1* | 11/2017 | Drake | H04L 63/0428 |
| 2018/0063132 A1* | 3/2018 | Zhang | H04L 63/102 |
| 2018/0069867 A1* | 3/2018 | Grajek | H04W 12/062 |
| 2018/0234411 A1* | 8/2018 | Masiero | H04L 63/0853 |
| 2019/0130094 A1* | 5/2019 | Votaw | G06F 21/44 |
| 2019/0273746 A1* | 9/2019 | Coffing | H04L 67/32 |
| 2020/0053111 A1* | 2/2020 | Jakobsson | H04L 51/12 |
| 2020/0143037 A1* | 5/2020 | Sunkavally | H04L 63/20 |
| 2020/0204542 A1* | 6/2020 | Nair | H04L 63/0853 |
| 2020/0351655 A1* | 11/2020 | Sunkavally | H04L 63/205 |
| 2021/0058395 A1* | 2/2021 | Jakobsson | H04L 67/306 |
| 2021/0131806 A1* | 5/2021 | Zaslavsky | G01C 21/20 |
| 2021/0133357 A1* | 5/2021 | Machani | G06F 21/6254 |
| 2021/0158193 A1* | 5/2021 | Davis | G06N 5/045 |
| 2021/0158356 A1* | 5/2021 | Goshen | G06Q 20/4016 |
| 2021/0243194 A1* | 8/2021 | Nelsen | H04W 12/06 |

OTHER PUBLICATIONS

Oasis-open.org [Online], "Assertions and Protocols for the Oasis Security Assertion Markup Language (SAML) V2.0—Errata Composite," Working Draft 07, Sep. 8, 2015 [Retrieved on Jan. 26, 2022], retrieved from: URL<https://www.oasis-open.org/committees/download.php/56776/sstc-saml-core-errata-2.0-wd-07.pdf>, 93 pages.
Fidoalliance.org [Online], "FIDO Authentication and the General Data Protection Regulation (GDPR)," May 2018, [Retrieved on Jan. 26, 2022], retrieved from: URL<https://frdoalliance.org/wp-content/uploads/FIDO_Authentication_and_GDPR_White_Paper_May2018-I.pdf>, 11 pages.

* cited by examiner

SYSTEMS AND METHODS FOR ADAPTIVE STEP-UP AUTHENTICATION

BACKGROUND

Many applications, including web applications, require a user to provide authentication data such as credentials (e.g., a username and password) in order to gain access to the application. These credentials are used to validate the identity of the user, allowing the user to access various resources and/or services offered by an enterprise system through the application. However, if a fraudster or malicious entity is able to steal the user's credentials, they can exploit the trust between the user's device and the enterprise system to gain unauthorized access to the web application. This would give them the capability to access user's sensitive data and conduct fraudulent activities such as improperly acquiring services, goods, and money through the web application.

SUMMARY

This specification generally relates to techniques for enhancing security controls of a web application by dynamically performing a step-up authentication in response to a detection of a risky user action or behavior on the web application. The strength level of the step-up authentication is adaptive to a user risk profile generated in real time for each user session and an action risk profile generated in real time for the user action on the web application.

In particular, one innovative aspect of the subject matter described in this specification can be embodied in a method for enhancing security controls of a web application. The method includes, in response to a user device's request to access the web application during a current user session, collecting, by a server system, authentication data of a user of the user device from a client system. The client system includes the user device and an identity provider. The method further includes authenticating, by the server system, an identity of the user based on the collected authentication data and generating, for the user session, a user risk profile that characterizes a level of risk that the user's identity will be compromised. The method includes, after the user risk profile has been generated for the current user session, authorizing the user device to access the web application. The method further includes: detecting that the user is attempting a particular action on the web application, and in response to the detection of the particular action, determining whether a step-up authentication is required based on the user risk profile generated for the current user session. In response to a determination that a step-up authentication is required, the method includes dynamically selecting, based on the generated user risk profile, a step-up authentication method for re-authenticating the user's identity; and providing one or more security requests defined by the selected step-up authentication method to the user device.

The foregoing and other embodiments can each optionally include one or more of the following features, alone or in combination.

Collecting the authentication data of the user from the client system may include: receiving, from the user device through the identity provider, the authentication data through a Security Assertion Markup Language (SAML) assertion.

The SAML assertion may include user authentication data. In some implementations, the SAML assertion may include custom data elements (e.g., user device attributes) and user endpoint status. The user device attributes may include at least one of (i) an IP address of the user device or (ii) location data of the device. When the SAML assertion does not include user device attributes, the method may further include collecting user device attributes from the user device.

Generating, for the user session, the user risk profile that characterizes the level of risk of the user's identity being compromised may include: computing a user risk score based on one or more of current user identity risk, historical user identity risk, web browser risk, user device risk, user behavior risk, and user network risk.

Determining whether a step-up authentication is required may include: generating an action risk profile for the particular action, and determining whether a step-up authentication is required based on (i) the user risk profile generated for the current user section, and (ii) the action risk profile generated for the particular action.

The particular action may be a financial transaction, and generating the action risk profile for the particular action may include: computing an action risk score based on one or more of a value of the financial transaction, a type of the financial transaction, behavioral and historical risk, or reputational risk.

Determining whether a step-up authentication is required may include: generating a client risk profile for the client system. Determining whether a step-up authentication is required may be performed based on one or more of (i) the user risk profile generated for the current user section, (ii) the action risk profile generated for the particular action, or (iii) the client risk profile generated for the client system.

The method may further include: after providing the one or more security requests defined by the selected step-up authentication method to the user device, determining whether the user has satisfied one or more security requests, and in response to a determination that the user has satisfied the one or more security, re-authenticating the user's identity and authorizing the user to perform the particular action on the web application.

The one or more security requests defined by the selected step-up authentication method may include one or more of (i) sending a one-time password (OTP) to the user via a short message service (SMS) or email and asking the user to provide the OTP, (ii) asking the user to provide a biometric based authentication, (iii) invoking identity proofing, (iv) invoking a user registration workflow leading to client re-authentication, (v) asking the user to provide an additional authentication using a hardware or software based authenticator, (vi) asking the user to enter a Completely Automated Public Turing test to tell Computers and Humans Apart (CAPTCHA), (vii) asking the user to click a checkbox reCAPTCHA v2 to indicate that the user is not a robot, (viii) using reCAPTCHA v2 (invisible badge) which is invoked directly via a javascript call when the user clicks on an existing button, (ix) asking the user to enter a reCAPTCHA v3 which returns a score for each request, or (x) asking the user to provide one or more answers to one or more security questions.

Another innovative aspect of the subject matter described in this specification can be embodied in one or more non-transitory computer storage media storing instructions that, when executed by one or more processors, cause the one or more processors to perform the method described above.

Yet another innovative aspect of the subject matter described in this specification can be embodied in a system that includes one or more processors and one or more non-transitory storage media storing instructions that, when executed by the one or more processors, cause the one or more processors to perform the method described above.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
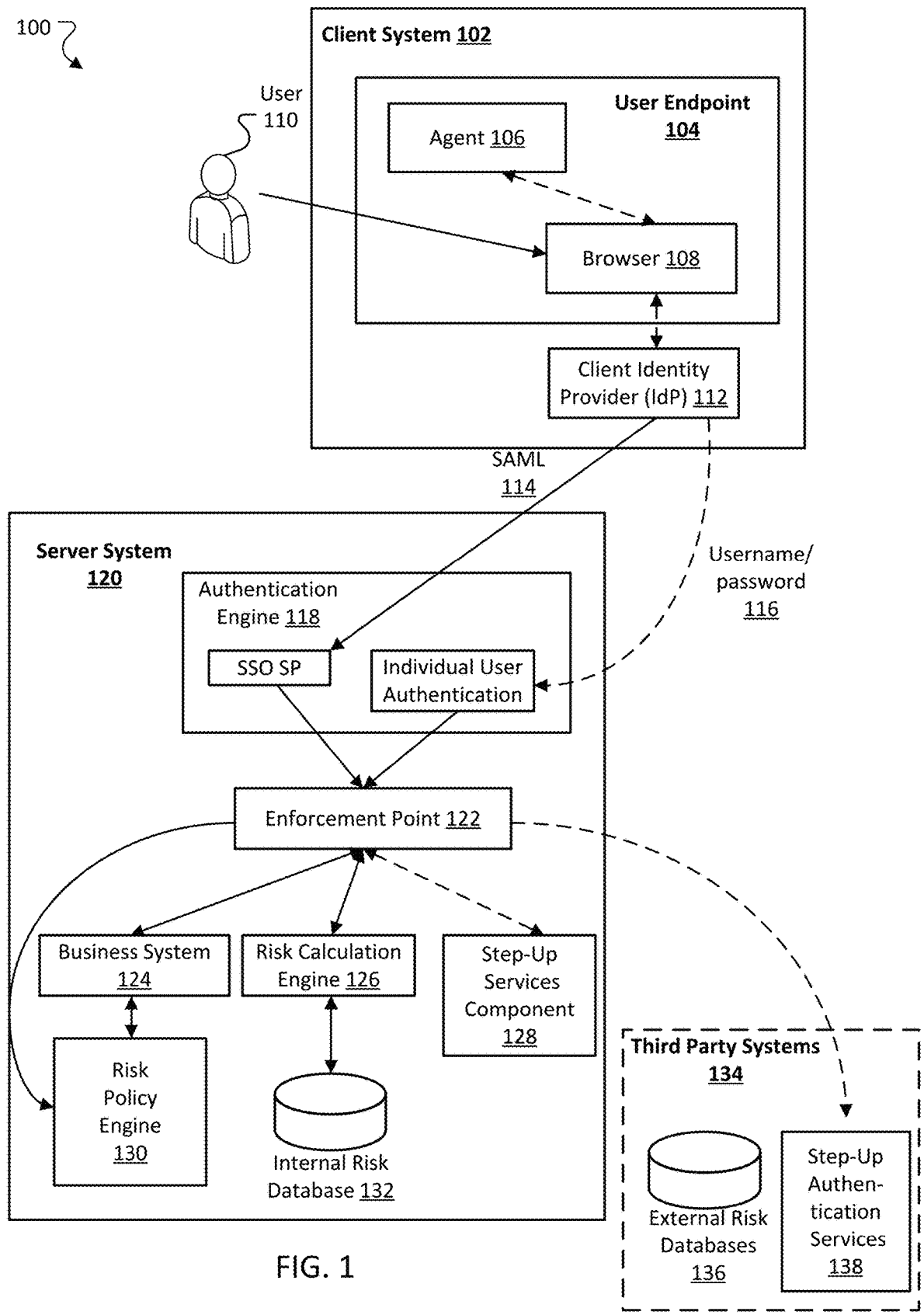
FIG. 1 shows an example environment for implementing adaptive step-up authentication to enhance security controls of a web application.

Many applications, including web applications, require a user to provide authentication credentials (e.g., a username and password) in order to gain access to the application. These credentials are used to validate the identity of the user, allowing the user to securely access various resources and/or services offered by an enterprise system through the web application. Some web applications (e.g., financial web applications), however, have been increasingly vulnerable to various attacks from fraudsters and other malicious entities in recent years. With rapid changes in technology, many financial institutions are now insisting on cashless and paperless transactions through web applications, thereby creating more opportunities and incentive to fraudsters to commit frauds and identity theft. Fraudsters may steal user credentials by, for example, exploiting the weak workflows for retrieving a forgotten username or password to gain unauthorized access to sensitive customer financial data and/or to perform fraudulent financial transactions. Some fraudsters may exploit known vulnerabilities in externally facing web applications to launch attacks and to bypass authentication and/or authorization controls to gain access to web applications.

Many clients (or users) may connect to a web application hosted by an enterprise system that provides services such as managing retirement benefits (e.g., 401K or 403B, IRA, financial planning etc.), health insurance benefits (medical, vision, dental, prescription, COBRA benefit etc.), investment management (e.g., stocks, bonds, mutual funds), or pension management benefits (defined benefits, plans, funds etc.), by successfully completing an authentication request via a Security Assertion Markup Language (SAML) assertion from their portal. Some of these clients may not have sufficient security controls if they have not implemented multi factor authentication (MFA) or security controls on their intranet benefits portal. If a fraudster or a malicious entity is able to either compromise a client's intranet portal or steal a client's user credentials due to insufficient security controls, they can then exploit the trust between the client portal and the enterprise system to gain unauthorized access to the client's sensitive data and/or to initiate fraudulent financial transactions.

For companies that provide employment benefits, medical or life insurance benefits, retirement benefits, investment management services and pension management benefits at an enterprise scale to clients (e.g., other large or medium sized businesses) through a connected group of web applications, one commonly used paradigm is to enable a single sign on (SSO) connection between each client and the service provider. SSO connection provides convenience to clients as it enables the clients to authenticate with all web applications in the group by logging in only once (e.g., by using only one set of credentials). However, SSO connection may hamper password security, leaving the clients' sensitive data more susceptible to be stolen. If a fraudster or a malicious entity is able to access an SSO password of a client, all of the client's accounts with the service provider can be compromised. This is particularly dangerous at the enterprise scale because the attacker has access to all resources and sensitive data that the compromised client (who may be a large business) has permissions to access.

This specification describes adaptive step-up authentication techniques that can address the above security problems associated with web applications. In particular, the techniques described herein include dynamically performing a step-up authentication in response to a detection of a risky user action (e.g., transferring a large amount of money out of an account) on the web application. The strength level of the step-up authentication is adaptive to a user risk profile generated in real time for each user session and an action risk profile generated for each user action on the web application. By monitoring and assess the risk of each user action on the web application and applying an adaptive step-up authentication to re-authenticate the user before allowing the user to perform a risky user action, the systems and methods described in this specification can effectively prevent fraudsters and malicious entities from performing illegal actions even after they have successfully accessed a web application using stolen credentials or other authentication data.

FIG. 1 shows an example environment 100 for implementing adaptive step-up authentication to enhance security controls of a web application. The environment 100 includes a client system 102 and a server system 120. In some implementations, the environment 100 may include one or more third party systems 134.

The client system 102 includes a user endpoint 104 and a client identity provider (also referred to as "a client IdP" for simplicity) 112. A user 110 is trying to gain access to a web application hosted by an enterprise system (for example, a web application hosted by a financial system of a financial institution) in order to use the resources/services provided by an enterprise. The user 110 may be an authorized entity (e.g., an employee, a plan participant, a registered user, a client, a business partner, etc.) with valid credentials to access the web application, or a malicious entity trying to gain unauthorized access to the enterprise system using stolen or compromised credentials. The enterprise system can also be referred to as a service provider (SP) that offers resources and/or services to users through the web application.

The user endpoint 104 is a computing device used by the user 110. Examples of the computing device include, but are not limited to, desktop, a laptop, a mobile device, a tablet, and a workstation. The user endpoint 104 includes a browser 108 and an agent 106. The browser 108 is a web browser resident on the user endpoint 104 and used by the user 110 to access the web application of the enterprise system. The agent 106 is an endpoint detection response and enforcement agent running on the user endpoint 104. The agent 106 has a capability to detect a current state of security and security registration status, and to recognize an operating system of the user endpoint 104. The agent 102 can also recognize operating system patches applied to the user endpoint 104. Operating system patches refer to updates that are used by software vendors (e.g. Microsoft, Oracle, etc.) to fix security vulnerabilities within an operating system, an application, or a software product. Operating system patches are also used to provide security, performance and functionality enhancements of the operating system, application or software product. The agent 106 can also detect an age of an Anti-Virus (AV) signature file. An antivirus (AV) signature file includes an AV signature that represents a unique fingerprint of a malware. The AV signature is a unique combination of bits/bytes, hashed data, and/or binary pattern that provides the capability to uniquely identify a memory or file system resident malware and is one of the primary data artifact(s) used by modern day antivirus (AV) systems to detect, block and remove malware.

One or more of the above data points collected by the agent 106 can be used later to determine a device risk of the user endpoint 104.

The client identity provider 112 is a subsystem used by the user endpoint 104 to perform local authentication (e.g., one-factor authentication (1FA) and two-factor authentication (2FA)) and authorization. Local authentication is the authentication that occurs at the user endpoint 104 (e.g. laptop, desktop or mobile device). The local authentication can be done using a traditional Kerberos based Active Directory issued and managed credentials (also known as local windows authentication), or using local device based credentials (e.g. iPhone). The client identity provider 112 also has the capability to inject data such as data about user authentication mechanisms and user endpoint status into a Security Assertion Markup Language (SAML) assertion.

Generally, an SAML assertion is XML document that includes user entitlement and authorization information generally expressed as name value pair attributes that is sent by an Identity Provider (e.g., the client identity provider 112 of FIG. 1) to a service provider (e.g., the server system 120). More particularly, there are three types of SAML Assertions: Authentication statements, Attribute statements and Authorization decision statements.

An authentication statement asserts to the service provider (SP) about the principal (user) authentication and provide the time of the said principal login and the method of authentication used (e.g., Kerberos, Password, HardwareToken, etc.)

An attribution statement asserts to the service provider that a given set of (SAML) attributes are known about the principal (user). The (SAML) attributes are generally name/value pairs of data that provide information about the principal (user).

An authorization decision statement asserts to the service provider that the principal (user) is authorized (or not) to perform a said action on a given resource given a specific evidence.

Any data points collected by the client identity provider 112 can be used to determine a client identity risk.

The server system 120 belongs to the enterprise system that the user 110 is trying to engage with through the web application. Generally, the server system 120 hosts the web application and other identity and security systems of the enterprise system. In particular, the server system 120 includes an authentication engine 118, an enforcement point 122, a business system 124, a risk calculation engine 126, a step-up services component 128, a risk policy engine 130, and an internal risk database 132.

The authentication engine 118 is a single sign on (SSO) service provider (SP) that processes authentication assertions (e.g., SAML assertions) received from an identity provider (e.g., the client identity provider 112). Once an authentication assertion is received, the authentication engine 118 parses attributes (e.g., username, etc.) and validates these attributes to determine if the request to access the web application came from a valid identity provider.

In some cases, the authentication engine 118 is configured to process SAML assertions from client identity providers after users have performed local authentication using 1FA and 2FA. In some other cases, the authentication engine 118 is configured to perform individual user authentication for users who choose to login in directly into the web application either due to the unavailability of an SSO setup or if the users are trying to login while not on a secured network (e.g., while not on a client company network). One or more of the data points collected by the authentication engine 118 during the authentication process can be used later to calculate a client identity risk.

As shown in the example of FIG. 1, the authentication engine 118 is configured to process the SAML assertion from the client IdP 112 after the user 110 has performed local authentication using 1FA and 2FA. The enforcement point 122 is a decision making component configured to receive input from authentication engine 118 including at least one of HTTP header variables, user/browser session variables, or SAML assertion elements and attributes.

HTTP header variables including attributes such as name and value pairs that allow the client system and server system to pass additional information with a HTTP request or response. The HTTP header variables define operating parameters of an HTTP transaction. Headers are generally grouped into the following groups according to their contexts: General, Request, Response and Entity. Some commonly used Request header fields are Connection, Content-Type, Cookie, Host, Referrer and user-agent. Some commonly used Response header fields are Age, Connection, Content-Disposition, Content-Encoding, Content-Length, Content-Type, Expires, Server, Set-Cookie and Transfer-Encoding.

User/Browser Session variables are special attributes created in memory when a user initiates (creates) a session with a web application. User/Browser Session variables are generally used to store user-specific information that may need be accessed (or shared) by other web pages within that application. Each session is tracked with a unique session-id that can be used to retrieve these (stored or cached) session variables. Some of these session variables may be personal attributes like name, address, user-id, and password, or other attributes like user preferences or privileges. The session variables are generally not shown in a query string. The session variables are generally cleared when the users terminates a session (e.g., by logging off).

Examples of SAML elements and attributes are described in detail in "Assertions and Protocols for the OASIS Security Assertion Markup Language (SAML) V2.0—Errata Composite," available at https://www.oasis-open.org/committees/download.php/56776/sstc-saml-core-errata-2.0-wd-07.pdf.

The enforcement point provides the received input to the risk calculation engine 126 and further interacts with the business system 124 to determine whether a step-up authentication is required to re-authenticate a user (e.g., the user 110) when the user has already been authorized to access the web application and is performing a particular action on the web application. If a step-up authentication is required, the enforcement point 122 determines which step-up authentication method should be used based on a cumulative risk score determined for a given user action on the web application. The enforcement point 122 then invokes the step-up services component 128 to execute the step-up authentication method.

The business system 124 manages the web application, stores users' sensitive data and performs user credential management Certificate management refers to the use of PKI based certificates to perform mutual authentication providing protection against man in the middle attacks and other forms of network breaches. Password policies refer to using phrase based long and complex passwords on the client side to provide protection against brute force attacks, password spray, and guessing attacks. Data governance refers to data management techniques that provide adequate protection against data exfiltration, leaks, and unauthorized access.

The one or more third party systems 134 are external systems that provide access to publicly available threat intelligence and data via web services. This data is used by the risk calculation engine 126 to determine the client risk.

The one or more third party systems 134 may include one or more external risk databases 136 that store externally available source for data including, but not limited to, known client data, known events, known client breach data, and security posture on a given business entity, client, plan participant, or user. This data is generally made available through web services via transaction or subscription fees.

The one or more third party systems 134 may further include one or more step-up authentication services 138. These step-up authentication services (e.g. Google authenticator) are available externally based on a subscription fee. As discussed above, instead of using the internal step-up services component 128, the enforcement point 122 may request one of the step-up authentication services 138 to perform the required step-up authentication.

Figure 2:
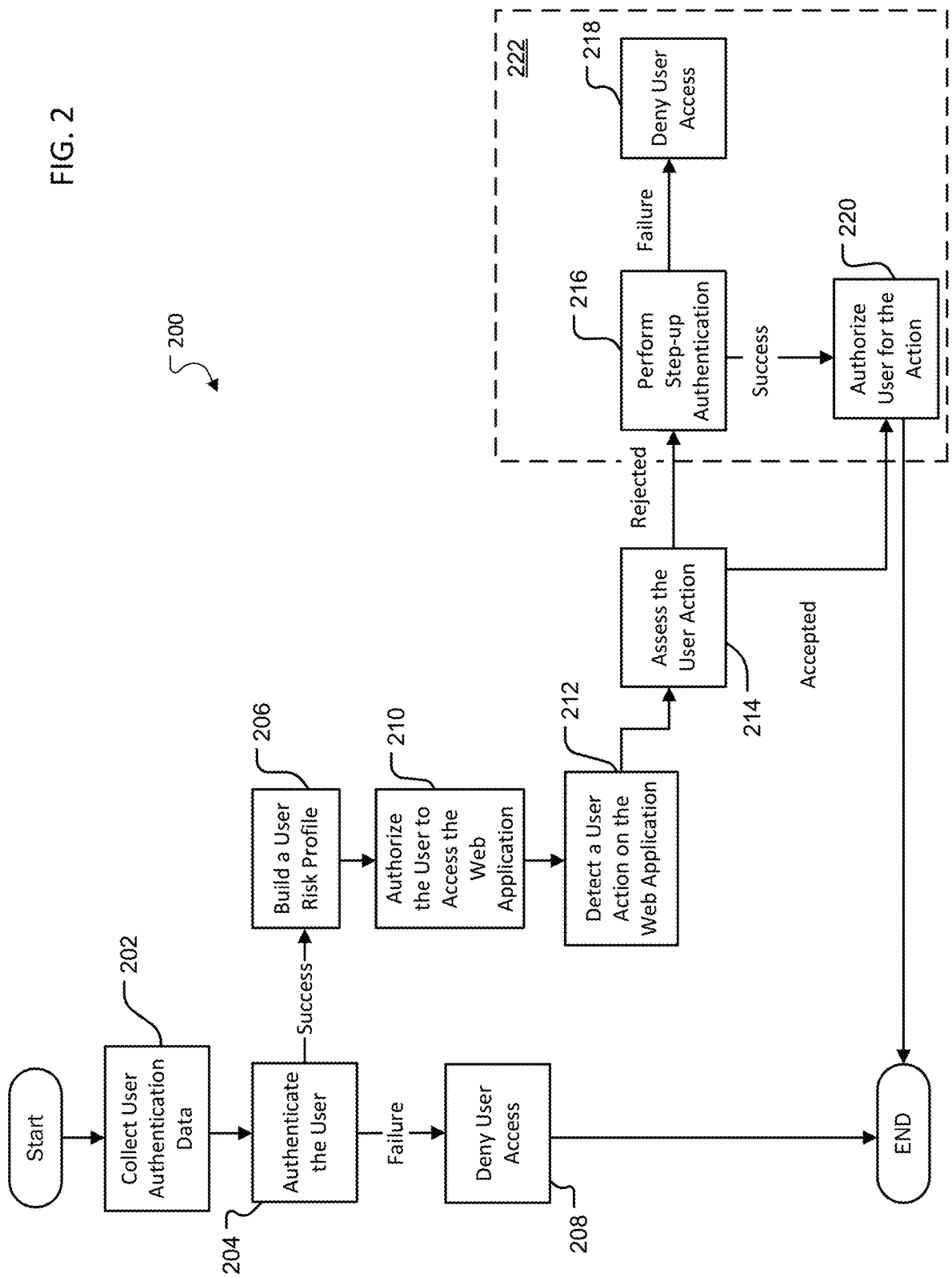
FIG. 2 is a flow chart illustrating a process for enhancing security controls of a web application using adaptive step-up authentication.

FIG. 2 is a flow chart illustrating a general process 200 for enhancing security controls of a web application using adaptive step-up authentication. For convenience, the process 200 will be described as being performed by a server system of one or more computers located in one or more locations. For example, the server system 120 of FIG. 1, appropriately programmed, can perform the process 200.

It is assumed that a user is requesting access to a web application via a browser running on a user device of a client system during a user session. The client system includes the user device and an identity provider. The user may be an authorized entity (e.g., an employee, a plan participant, a registered user, a client, a business partner, etc.) with valid credentials to access the web application, or a malicious entity trying to gain unauthorized access to the web application using stolen or compromised credentials.

At step 202, in response to the user device's request to access the web application during the current session, the server system which hosts the web application receives the user's authentication data from the client system. In particular, the server system can receive, from the identity provider of the client system, the authentication data through a Security Assertion Markup Language (SAML) assertion. The authentication data includes user authentication data. In some implementations, user device attributes include at least an IP address and location data of the user device may be passed to the server system via the SAML assertion. In some implementations, metadata related to previously completed multi-factor authentication(s) of the user device is passed to the server system as a value within the SAML assertion from the client system. In some other implementations, additional non-sensitive security information pertaining to the user or the user session is passed to the server system as metadata within the SAML assertion from the client system. Such metadata will be used to further build a user risk profile in order to determine the need for a step-up authentication in response to a user action on the web application.

The server system then authenticates an identity of the user based on the received authentication data (step 204). In step 204, the user is either authenticated (success) or denied access (failure) to the web application.

If the user is denied access (step 208), then the process ends.

If the user is successfully authenticated, then after the user is authenticated and before the user is authorized to access the web application, the server system generates a user risk profile against the user (step 206). The user risk profile is cached in memory for the active session and is subsequently persisted with the user's account information in an internal risk database, for example, internal risk database 132 of FIG. 1.

The server system dynamically generates a current user risk profile for the current user session. That means, the user risk profile is generated in real time for each user session, therefore is different for each user session. This allows the server system to collect the most updated risk information about the user in real time, thereby can generate the user risk profile more accurately. The user risk profile is later used by step 214 to assess a particular user action against the user in order to determine the risk of the user's current action and whether or not to pass the user to a step-up authentication workflow 216. The user risk profile includes components that collectively represent a risk of the user's identity being compromised during the user's current session. These components are described in more detail with reference to FIG. 3. In some implementations, the user risk profile is the only factor used in order to determine the risk of the user's action (e.g., the likelihood that the user's action is a fraudulent action) at the time of a requested action on the web application. In some other implementations, in addition to the user risk profile, at least one of an action risk profile (306) or a client risk profile (308) is used in order to determine the risk of the user's action being request by the user.

After the user risk profile has already been generated for the current session, the server system authorizes the user to access the web application (step 210). As the user browses the web application, the server system monitors and detects each action of the user on the web application (step 212). Once an action is detected, the server system assesses the risk of the action of the user on the web application to determine whether a step-up authentication is required to re-authenticate and authorize the user to perform the action (step 214). The process of assessing each action of the user is described in more detail below with reference to FIG. 3. In some implementations, the user risk profile is the single factor used in order to determine the risk of the user's action (e.g., the likelihood that the user's action is a fraudulent action) at the time of a requested action on the web application. In some other implementations, in addition to the user risk profile, at least one of an action risk profile (306) or a client risk profile (308) is used in order to determine the risk of the user's action being request by the user.

The action can either be accepted or rejected based on the result of the above risk assessment of the action. For example, the server system may determine a cumulative risk score for the user's current action. If the cumulative risk score is lower than a threshold score, the action is considered as a low-risk action and is accepted. If the cumulative risk score exceeds a threshold score, the action is considered as a high-risk action and is rejected.

If the action is accepted, a step-up authorization is not required and the server system authorizes the user for the requested action (step 220).

If the action is rejected, a step-up authorization is required and the server system passes the user's action to a step-up authentication workflow 222 (step 216). In this case, the server system also assesses which step-up authentication method to provide to the user device after assessing whether or not the user needs to complete the step-up authentication workflow 222. For example, if a cumulative risk score of the user action exceeds a threshold risk score, the system determines that a strong step-up authentication method (e.g., a multiple and dynamic step-up authentication method such as identity proofing, authenticators, client re-authentication, or bio-metric authentication) is required. In contrast, if a cumulative risk score of the user action is lower than a threshold risk score, the system determines that a weaker step-up authentication method (e.g., a singular step-up dynamic authentication method such as one time password (OTP) or Captcha) is sufficient to re-authenticate and authorize the user to perform the current action.

The server system provides the selected step-up authentication method to the user device. The step-up authentication method initiates one or more security requests to the user. The one or more security requests initiated by the selected step-up authentication method may include one or more of (i) sending a one-time password (OTP) to the user via a short message service (SMS) or email and asking the user to provide the OTP, (ii) asking the user to provide a biometric based authentication, (iii) invoking identity proofing, (iv) asking the user to provide an additional authentication using a hardware based authenticator, (v) asking the user to enter a Completely Automated Public Turing test to tell Computers and Humans Apart (CAPTCHA), (vi) asking the user to enter a reCAPTCHA v2 to identify that the user is not a robot, (vii) using reCAPTCHA v2 (invisible badge) which is invoked directly via a javascript call when the user clicks on an existing button, (viii) asking the user to enter a reCAPTCHA v3 (which returns a score between 1.0 and 0.0, with a lower score likely being a bot) for each request, allowing an appropriate risk based action to be taken, or (ix) asking the user to provide one or more answers to one or more security questions that are hard to guess and for which the answers have a minimum length restriction (e.g., a minimum length of at least 12 characters).

The system determines whether the user has satisfied one or more security requests initiated by the selected step-up authentication method.

In response to a determination that the user has satisfied the one or more security requests initiated by the selected step-up authentication method, the server system re-authenticates the user's identity and authorizes the user to perform the particular action on the web application (step 220).

In response to a determination that the user has not satisfied the one or more security requests initiated by the selected step-up authentication method, the server system denies the user's requested action (step 218). In some implementations, the server system may temporarily restrict the user's access to the web application. The server system may also notify the authorized user via another communication channel (e.g., email, SMS, or phone call) to check if the authorized user had requested the action that was denied. If the authorized user confirms that s/he had not requested the action, the server system may suggest the authorized user to change their credentials in order to protect their account on the web application. By taking these steps after denying the user's requested action, the server system can detect fraud immediately and stop further security breaches and fraudulent activities on the web application.

Figure 3:
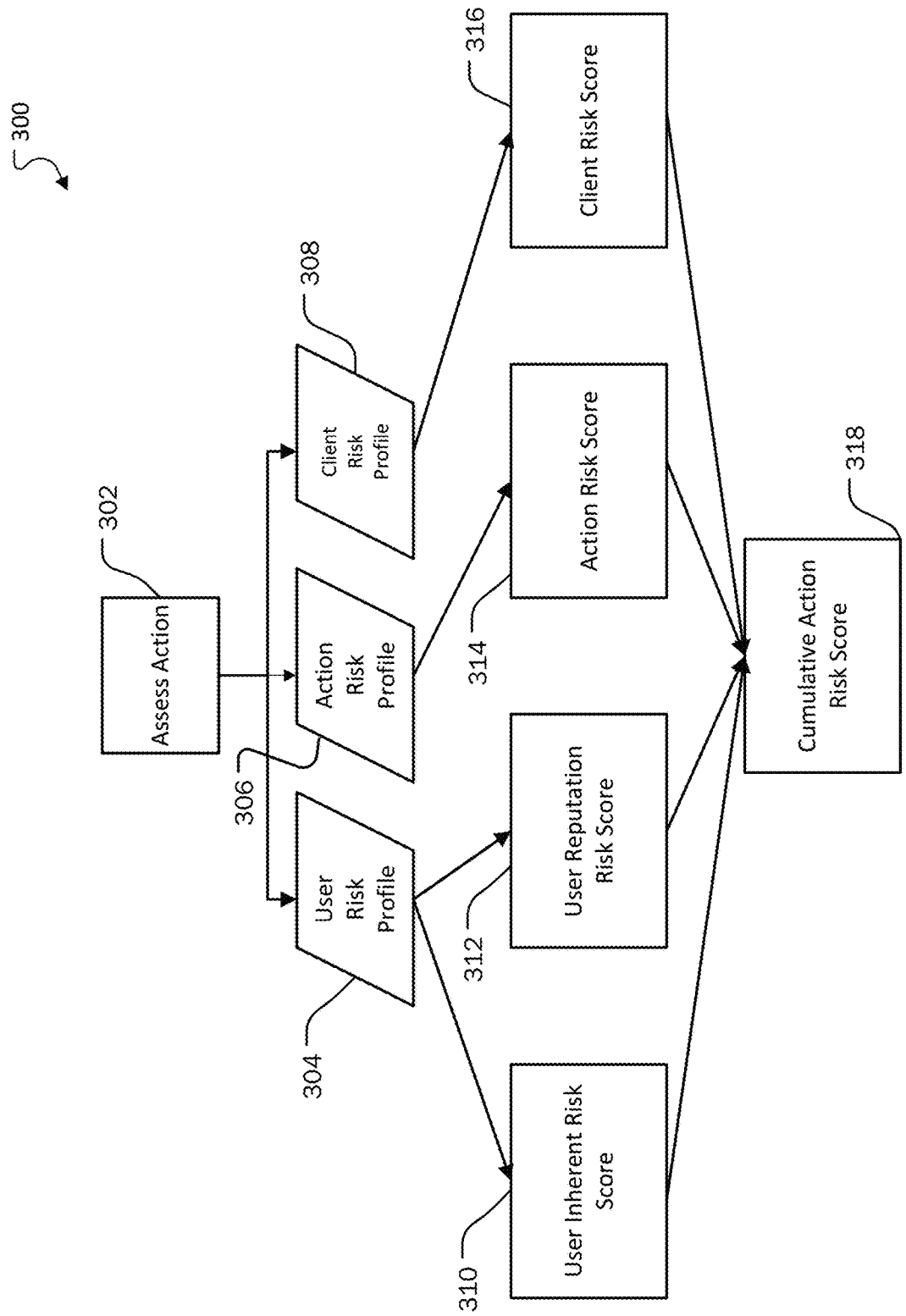
FIG. 3 is a flow chart demonstrating a process for assessing a user action on the web application.

FIG. 3 is a flow chart demonstrating a process for assessing a user action on the web application. For convenience, the process 300 will be described as being performed by a server system of one or more computers located in one or more locations. For example, a server system, e.g., the server system 120 of FIG. 1, appropriately programmed, can perform the process 300.

The process starts in step 302 when the server system assesses the action that the user is requesting. To assess the requested action, the server system calculates a cumulative action risk score for the requested action based on a user risk profile 304, and optionally, at least one of an action risk profile 306 or client risk profile 308. As discussed above, the user risk profile was built against the user at the beginning of the user session before authorization to the web application, in step 206 of FIG. 2. The user risk profile includes a user inherent risk score (310) and a user reputation risk score (312) as described below. The action risk profile includes an action risk score (314). The client risk profile includes a client risk score (316). The details of the action risk score and client risk score are shown below. All of the above risk scores can be dynamically calculated on a linear 0-10 scale: 0 being the lowest (i.e. complete confidence) and 10 being the highest (risk). The following description provides examples of components that can be used to calculate these risk scores. The server system may use one or more of the components listed below for calculating the accumulate action score for the requested action to determine whether to proceed with a step-up authentication.

The calculation of some of the risk scores below assumes the availability of data that would be gauged through various sources including but not limited to data elements within SAML assertions, browser session attributes, and historical data known to the risk calculation engine within the server system. Data that is not available at the time of calculation of the cumulative action risk score may be removed from consideration.

User Inherent Risk Score (310)

The user inherent risk score can be determined on various sub-scores. Each sub-score is calculated on a linear 0-10 scale as detailed below.

(i) Current User Identity Risk Score

This risk score can be calculated by examining the user's identity, which may include but not limited to the user-name, the strength of the password, and if a multi factor authentication (MFA) was conducted before portal access was provided to the user either by a direct login action or through a combination of local authentication and MFA (or lack thereof) followed by single sign on (SSO) via a SAML assertion from the client network to the server system. In addition, the MFA method itself will have an associated confidence rating (e.g. short message service one time password (SMS OTP) is considered less secure than push notification or fast identity online (FIDO) token).

(ii) Browser Risk Score

The browser risk score can be calculated by using the user's browser type (e.g. Internet Explorer (IE), Chrome, Firefox, or Safari) and a browser version number. This information can be determined from the browser user-agent (e.g., the agent 106 of FIG. 1) and other browser session variables. The risk score will factor in known vulnerabilities and exploits available for a given browser type and version. This information may be gauged from National Vulnerability Database (available at https://nvd.nist.gov/) and/or Common Vulnerability and Exposures (available at https://cve.mitre.org/) using Common Vulnerability Scoring System Version 3.0 (CVSS v3.0), and other available sources.

(iii) Device Risk Score

The device risk score can be calculated by using one or more of following attributes, if available.

a) Registration status: This risk score factors in if the device has a previous registration with an identity provider of the enterprise system. If a previous registration exists then its date/time and other associated behavior history can be analyzed to help determine the score.

b) Operating System (OS): This risk score factors in the operating system and its version running on the user device. Different residual risk scoring may be used for operating systems (e.g. windows has a higher risk than MacOS or Linux). The OS version number and the number of vulnerabilities that may exist for same will also help determine the risk score.

c) Anti-Virus (AV) status: This risk score factors in how current is the AV signature file on the user's device. For a system that is domain joined, generally the AV signature file is updated every 4-6 hours. The risk score algorithm will factor in the number of high risk vulnerability signatures not available in the current signature file, with special consideration for known zero day or high risk vulnerabilities. AV signatures older than 7 days may create an automatic high risk score of 10. The risk score will increase with the number of missing AV signatures.

d) Patch status: This risk score factors in the security patch status of the device. The score would be based on how far behind the device is from the generally available patches. Being 14 days late to patch, from whenever patches are released, would automatically create a high risk score. The system would tap into patch histories from the major vendors.

(iv) Behavior Risk Score

The user behavior risk score will encompass the user browsing history both internal and external to the web application using techniques such as click through patterns and ad-tracking, the login date-time, the last time the user logged in and/or was subjected to a step-up authentication.

User Reputation Risk Score (312)

The User Reputation Risk Score can be determined on various sub-scores. Each sub-score will also be calculated on a linear 0-10 scale as detailed below.

(i) Historical User Identity Risk Score

The user reputation risk score can be calculated as high if the user has been a victim of ID/Password theft or other forms of credential and identity theft and compromise. The date of ID or credential theft would be another variable in the risk score calculation. A risk calculation engine (e.g., the risk calculation engine 126 of FIG. 1) will have access to a dark web scanning service that will search for stolen credentials for a given user based on available information like name, email address and other forms of readily available personally identifiable information (PII).

(ii) User Network Risk Score

The user network risk score can be calculated based on an IP Geolocation database and the risk profile of the IP address used by the device (e.g. location, virtual private network (VPN), Tor exit node, public access etc.)

Action Risk Score (314)

The action risk score can be determined on various sub-scores. Each sub-score will also be calculated on a linear 0-10 scale as detailed below.

(i) The Impact of the Action

This risk score factors in, for example, if the action is a financial transaction, (a) the dollar amount of a given transaction being examined, (b) or the inherent risk value of the transaction (e.g. money out to an external source).

(ii) The Type of Action

This risk score factors in the type of the action including but not limited to (a) money out, (b) profile change (e.g. email address, home/work address change or beneficiary change etc.), and (c) credential (user-id/password) change with historical treatment.

(iii) Behavioral and Historical Risk Score

This risk score can be calculated by using the typical action usage paradigm including but not limited to (a) transaction values if the action is a financial transaction, (b) the time of day the action was made, (c) association with other behaviors exhibited on the web application, (d) historical information on the frequency and volume of actions (e.g., transactions) made in the past 30, 60 and 90 days.

(iv) Action Reputational Risk Score

This risk score can be calculated based on intelligence available from peers about this type of action being attacked more than usual across the industry (e.g., financial industry if the action is a financial transaction).

Client Risk Score (316)

The client risk score can be determined on various sub-scores. Each sub-score will also be calculated on a linear 0-10 scale as detailed below.

(i) Client Environment Risk Score

This risk score can be calculated based on the endpoint security controls in place for the user, plan participant, or client. The controls that would be assessed may include but will not be limited to the implementation of Next Gen anti-virus (NGAV), endpoint discovery and response (EDR), capability to prevent unauthorized or unknown binary execution, endpoint biometric controls, and data loss prevention (DLP).

(ii) Known Events

This risk score can be calculated based on known events including but not limited to (a) open enrollment period (which would lead to lot of user activity), new hires, layoffs and terminations.

(iii) Known Data

This risk score can be calculated based on known client data including but not limited to (a) Historical IP sources and used IP ranges (based on office or home locations) (b) known client devices and other assets (c) Historical data about effectiveness of their.

(iv) Known Client Breach Data

This risk score can be calculated based on known network and application breaches and other attacks including but not limited to ransomware, DDoS, DNS hijacking and malware infestations for the last 36 months. This data can be sourced in from multiple publicly and privately available intelligence sources.

(v) Security Posture

If the client uses multi factor authentication for network and benefits portal access for all its employees. The usage of certificate management policies, password policies, and data governance would also be factors taken into consideration.

(vi) Other Risk Factors

This risk score can be calculated from other publicly or privately sourced risk factors available about the user/client.

After determining one or more of the above risk scores, the server system determines the cumulative action risk score for the requested action (step 318).

In some implementations, the server system may determine the cumulative action risk score by taking an average of the determined one or more risk scores. In some other implementations, the server system may assign a respective importance weight to each of the determined one or more risk scores. In these implementations, the server system may determine the cumulative action risk score by taking a weighted average of the determined one or more risk scores.

For example, the server system may compute the cumulative action risk score using the following equation:

$$crs=(\Sigma_a^b rs(n))/(b-a), \quad (1)$$

where crs is the cumulative risk score for a given action (e.g., transaction), where n>0 and signifies each individual risk score that may be calculated, where (b−a) signifies the total number of risk scores in play for a given action, and where $$rs(n)=f(\text{data}) \times \text{weightage}(n). \quad (2)$$

In Eq. (2), f(data) signifies a function that is derived from a semi-supervised machine learning algorithm that will take input data parameters. Semi-supervised machine learning in this context refers to an algorithm that observes/examines input pairs (labeled and unlabeled data) to deduce a function that is capable of dynamically calculating the said risk from live data. This algorithm will factor in a default score if the input live data is either invalid or not available.

Weightage(n) is >0 and applies a respective important weight (e.g., a weight in a scale of 0-1) to each risk score. In some implementations, the weightage(n) may have a static pre calculated weight value based on historical data.

In some other implementations, the weightage(n) may have a variable weight value calculated for certain circumstances using the following equation:

$$\text{weightage}=ts/ds, \quad (3)$$

where ts is a threat score assigned to a component, application or system and is inclusive but not limited to known risk from malware, threat actors or malicious entities and other forms of advanced persistent threat and insider threat, where ds is a defensive score which encompasses one or more of the following: (i) the capability of a component, application or system to deploy counter measures against malware and other advanced threats, insider threat, (ii) the capability to deploy monitoring and mitigating controls, (iii) the capability to hire educated and well trained cyber security professionals, or (iv) the maturity of the security stack including but limited to perimeter, network and end-point security tools and the implementation of good security hygiene and practices like zero trust with least privilege with full network segmentation.

Figure 4:
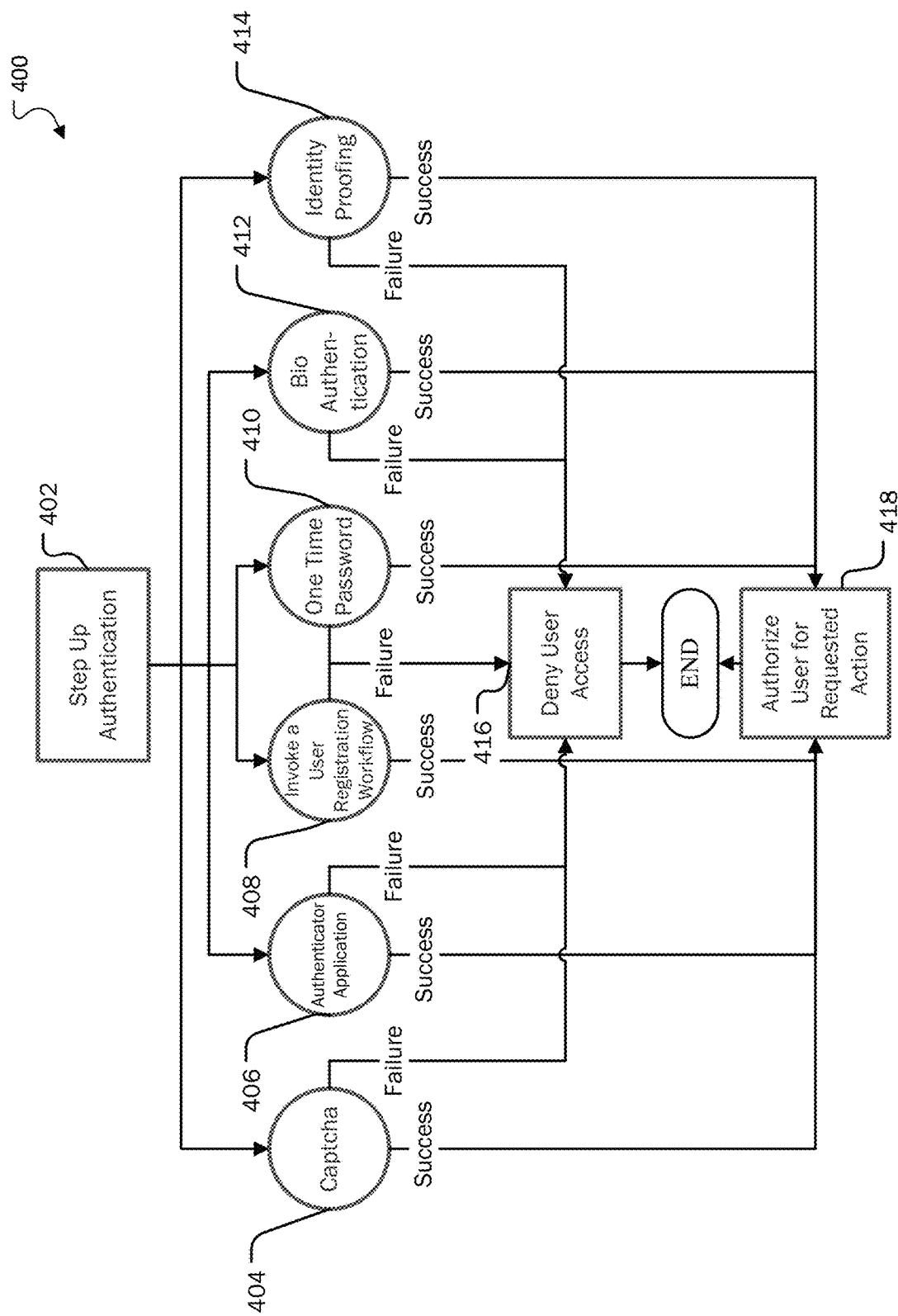
FIG. 4 illustrates an example process for re-authenticating the user to perform a user action using a step-up authorization method.

FIG. 4 illustrates an example process for re-authenticating the user to perform a user action using a step-up authorization method. For convenience, the process 400 will be described as being performed by a server system of one or more computers located in one or more locations. For example, a server system, e.g., the server system 120 of FIG. 1, appropriately programmed, can perform the process 400.

The process starts when the server system determines that a step-up authentication is required to re-authenticate and authorize a user to perform a particular action (step 402).

The server system then determines which step-up authentication method to use based on the cumulative action score of the particular action. The server system provides the selected step-up authentication method to the user device. The step-up authentication method initiates one or more security requests to the user.

For example, the one or more security requests may include at least one of asking the user to enter a Completely Automated Public Turing test to tell Computers and Humans Apart (CAPTCHA), asking the user to click a checkbox reCAPTCHA v2 to identify that the user is not a robot, using reCAPTCHA v2 (invisible badge) which is invoked directly via a javascript call when the user clicks on an existing button, or asking the user to enter a reCAPTCHA v3 (which returns a score between 1.0 and 0.0, with a lower score likely being a bot) for each request, allowing an appropriate risk based action to be taken) (step 404).

As another example, the one or more security requests include using a hardware or software based authenticator (step 406).

Hardware based authenticators use physical devices (e.g. USB drives) to provide multi-factor authentication. These authenticators may use tamper resistant packaging and stores cryptographic keys to generate digital signatures. In some implementations, a hardware based authenticator may use Universal 2nd Factor (U2F) and FIDO2 protocols developed by the FIDO alliance allowing users to perform secure logins into their accounts using FIDO based public/private key pair generated by the hardware authenticator without exposing the private key.

Software based authenticators use software applications to provide (multi factor) authentication. These authenticators may implement time based onetime password algorithm (TOTP) and/or HMAC based onetime password algorithm (HOTP). These algorithms may generate a 6 to 8 character one time password which can be used for 2FA into an application that has integrated with the said authenticator.

As another example, the one or more security requests include invoking a user registration workflow that leads to re-authentication the user at the client side (step 408). That means, the server system is configured to redirect the user device to a user registration workflow and after the user completes a user registration, the server system re-authenticates the user at the client side. This scenario may apply in the case of processing a SAML assertion from the client IdP. Depending upon the user's dynamically created risk profile, the user device may be redirected into a registration workflow so that the user can create a formal identity with the service provider. As part of the identity creation and registration process, the user may be asked to provide information that may include but not be limited to an email address and mobile phone number (for sending a one time password (OTP)), ask permission to create a registration and association of the device used for login with the user account, or create an association of a biometric authenticator with the user account. Once the registration step is completed, the user will be redirected back to the client side so that they can reinitiate the SSO workflow.

As yet another example, the one or more security requests include sending a one-time password (OTP) to the user via another communication channel such as a short message service (SMS), an email, or a phone call and asking the user to provide the OTP (step 410). In particular, a one time password (OTP) generator can be used to provide a (multi factor) authentication. Some modern OTP generators have now implemented time-based one time password algorithm (or TOTP algorithm). This algorithm can generate a 6 to 8 character one time password that can be used for 2FA into a web based application.

As another example, the one or more security requests include asking the user to provide a biometric based authentication (e.g., using fingerprint, voice recognition, or face recognition) (step 412).

In a biometric based authentication system (e.g. a Fast ID Online (FIDO) solution implemented on a mobile device), a biometric (the first factor) is on a user and a private cryptographic key (the second factor) is stored on a device of the user. The biometric is presented to the device and matched locally. After a successful match, the device then uses the private key in a cryptographic protocol to respond to an authentication challenge issued by the service provider. The combination of the user verification through biometrics and the private key makes phishing attacks irrelevant. The independence of these FIDO authentication factors can be enhanced by the use of modern hardware-backed technologies present on an ever increasing percentage of consumer devices (mobile and desktop) such as Secure Elements, Trusted Execution Environments (TEE) or Trusted Platform Modules (TPM). These hardware solutions are an independent element in the device, specifically created to ensure isolation from the rest of the device (which is running complex mobile operating systems and numerous applications), and protect the device from malware and other attacks. FIDO authentication is described in more detail at http://fidoalliance.org and https://fidoalliance.org/wp-content/uploads/FIDO_Authentication_and_GDPR_White_Paper_May2018-1.pdf)

As another example, the one or more security requests include using identity proofing (step 414).

Identity-proofing is a technique to verify users' identities before an identity (account, credentials etc.) is created or modified for them in a given system. The identity proofing solution will use dynamic knowledge-based articles where the proofing is done based on "life history" of the users or based on transaction information aggregated from public and proprietary data source. Unlike traditional knowledge-based articles that are vulnerable to fraudsters because the answers to commonly asked questions (e.g., social security number, date of birth, mother's maiden name etc.) can be known to the fraudsters from information they have collected from the many security breaches and identity thefts in the recent past (e.g. Equifax, and office of personnel management (OPM) etc.), dynamic knowledge-based articles are only known to the authorized users and harder for fraudsters to compromise.

Another way that may be used for identity proofing is to take the identity verification completely outside of the vulnerable channel by utilizing Out-of-band (OOB) proofing. Generally, an OOB implementation has the capability to issue an out of band token to a mobile phone, use a authentication token, or make an automated phone call from the system to a phone number of record that will give the user an one time password.

Another way that may be used for identity proofing is to perform a biometric verification (e.g., a voice print) which provides an extra layer of protection against man-in-the-middle attacks that OTP's sent via SMS or emails messages are susceptible to. For example, for a web application, one such way is to have an automated system either text or call the user at their registered phone number and ask them to call back at a predetermined phone number (e.g., a 800 phone number) where their voice print would be verified.

In response to a determination that the user has satisfied the one or more security requests initiated by the selected step-up authentication method, the server system re-authenticates the user's identity and authorizes the user to perform the particular action on the web application (step 418).

In response to a determination that the user has not satisfied the one or more security requests initiated by the selected step-up authentication method, the server system denies the user's requested action (step 416). At this time, the server system may ends the user session. In some implementations, the server system may temporarily restrict the user's access to the web application. The server system may also notify the authorized user via another communication channel (e.g., email, SMS, or phone call) to check if the authorized user had requested the action that was denied. If the authorized user confirms that s/he had not requested the action, the server system may suggest the authorized user to change their credentials in order to protect their account on the web application. By taking these steps after denying the user's requested action, the server system can detect fraud immediately and stop further security breaches and fraudulent activities on the web application.

While the above description includes example implementations of adaptive step-up authentication techniques in a web application of a financial system, the adaptive step-up authentication techniques described herein can be implemented in other systems that deals with users' sensitive data and/or involves valuable transactions and thereby can be susceptible to identity theft and other forms of cybercrime. For example, the adaptive step-up authentication techniques described herein can be implemented in systems of state or federal governmental agencies, educational services, medical services, credit bureaus, enforcement of parental controls for social media sites, and ecommerce retailers to prevent fraudulent activities and protect users' finances, security, and reputation.

This specification uses the term "configured" or "operable" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML, page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially be claimed as such, one or more features from a claimed combination can in some cases be excised from the combination, and the claimed combination may be directed to a sub combination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for enhancing security controls of a web application, the method comprising:
   in response to a request of a user device to access the web application during a current user session, collecting, by a server system, authentication data of a user of the user device from a client system, the client system comprising the user device and an identity provider;
   authenticating, by the server system, an identity of the user based on the collected authentication data;
   generating, for the current user session, a user risk profile that characterizes a level of risk that the identity of the user will be compromised;
   after the user risk profile has been generated for the current user session, authorizing the user device to access the web application;
   detecting that the user is attempting a particular action on the web application,
   generating an action risk profile for the particular action and a client risk profile for the client system;
   in response to the detection of the particular action, determining whether a step-up authentication is required based on (i) the user risk profile generated for the current user session, (ii) the action risk profile generated for the particular action, and (iii) the client risk profile generated for the client system;
   in response to a determination that the step-up authentication is required, dynamically selecting, based on the generated user risk profile, a step-up authentication method for re-authenticating the identity of the user; and
   providing one or more security requests defined by the selected step-up authentication method to the user device.

2. The method of claim 1, wherein collecting the authentication data of the user from the client system comprises: receiving, from the user device through the identity provider, the authentication data through a Security Assertion Markup Language (SAML) assertion.

3. The method of claim 1, wherein the authentication data comprises user authentication data.

4. The method of claim 3, wherein the authentication data further comprise user device attributes, wherein the user device attributes comprise at least one of (i) an IP address of the user device or (ii) location data of the device.

5. The method of claim 3, further comprising:
   collecting user device attributes from the user device, wherein the user device attributes comprise at least one of (i) an IP address of the user device or, and (ii) location data of the device.

6. The method of claim 1, wherein generating, for the current user session, the user risk profile that characterizes the level of risk of the identity of the user being compromised comprises:
   computing a user risk score based on one or more of current user identity risk, historical user identity risk, web browser risk, user device risk, user behavior risk, or user network risk.

7. The method of claim 1, wherein determining whether a step-up authentication is required comprises:
   generating an action risk profile for the particular action, and
   determining whether a step-up authentication is required based on (i) the user risk profile generated for the current user session, and (ii) the action risk profile generated for the particular action.

8. The method of claim 7, wherein the particular action is a financial transaction, and wherein generating the action risk profile for the particular action comprises:
   computing an action risk score based on one or more of a value of the financial transaction, a type of the financial transaction, behavioral and historical risk, or reputational risk.

9. The method of claim 1, further comprising:
   after providing the one or more security requests defined by the selected step-up authentication method to the user device, determining whether the user has satisfied the one or more security requests, and
   in response to a determination that the user has satisfied the one or more security requests initiated by the selected step-up authentication method, re-authenticating the identity of the user and authorizing the user to perform the particular action on the web application.

10. The method of claim 1, wherein the one or more security requests comprise one or more of (i) sending a one-time password (OTP) to the user via a short message service (SMS) or email and asking the user to provide the OTP, (ii) asking the user to provide a biometric based authentication, (iii) invoking identity proofing, (iv) invoking a user registration workflow leading to client re authentication, (v) asking the user to enter a Completely Automated Public Turing test to tell Computers and Humans Apart (CAPTCHA), (vi) asking the user to confirm that the user is not a robot, (vii) invoking an invisible CAPTCHA when the user clicks on an existing button, (viii) invoking a CAPTCHA which returns a score for each request, or (ix) asking the user to provide one or more answers to one or more security questions.

11. One or more non-transitory computer storage media storing instructions that, when executed by one or more processors, cause the one or more processors to perform operations for enhancing security controls of a web application, the operations comprising:
in response to a request of a user device to access the web application during a user session, collecting, by a server system, authentication data of a user of the user device from a client system, the client system comprising the user device and an identity provider;
authenticating, by the server system, an identity of the user based on the collected authentication data;
generating, for the current user session, a user risk profile that characterizes a level of risk that the identity of the user will be compromised;
after the user risk profile has been generated for the current user session, authorizing the user device to access the web application;
detecting that the user is attempting a particular action on the web application;
generating an action risk profile for the particular action and a client risk profile for the client system;
in response to the detection of the particular action, determining whether a step-up authentication is required based on (i) the user risk profile generated for the current user session, (ii) the action risk profile generated for the particular action, and (iii) the client risk profile generated for the client system;
in response to a determination that the step-up authentication is required, dynamically selecting, based on the generated user risk profile, a step-up authentication method for re-authenticating the identity of the user; and
providing one or more security requests defined by the selected step-up authentication method to the user device.

12. The one or more non-transitory computer storage media of claim 11, wherein the operations for collecting the authentication data of the user from the client system comprise: receiving, from the user device through the identity provider, the authentication data through a Security Assertion Markup Language (SAML) assertion.

13. The one or more non-transitory computer storage media of claim 11, wherein the operations for generating, for the user session, the user risk profile that characterizes the level of risk that the identity of the user will be compromised comprise: computing a user risk score based on one or more of current user identity risk, historical user identity risk, web browser risk, user device risk, user behavior risk, and user network risk.

14. The one or more non-transitory computer storage media of claim 11, wherein the operations for determining whether a step-up authentication is required comprise:
generating an action risk profile for the particular action, and
determining whether a step-up authentication is required based on (i) the user risk profile generated for the current user section, and (ii) the action risk profile generated for the particular action.

15. The one or more non-transitory computer storage media of claim 14, wherein the particular action is a financial transaction, and wherein the operations for generating the action risk profile for the particular action comprise:
computing an action risk score based on one or more of a value of the financial transaction, a type of the financial transaction, behavioral and historical risk, and reputational risk.

16. The one or more non-transitory computer storage media of claim 11, wherein the operations further comprise:
after providing the one or more security requests defined by the selected step-up authentication method to the user device, determining whether the user has satisfied one or more security requests, and
in response to a determination that the user has satisfied the one or more security requests, re-authenticating the identity of the user and authorizing the user to perform the particular action on the web application.

17. The one or more non-transitory computer storage media of claim 11, wherein the one or more security requests comprise one or more of (i) sending a one-time password (OTP) to the user via a short message service (SMS) or email and asking the user to provide the OTP, (ii) asking the user to provide a biometric based authentication, (iii) invoking identity proofing, (iv) invoking a user registration workflow leading to client re-authentication, (v) asking the user to enter a Completely Automated Public Turing test to tell Computers and Humans Apart (CAPTCHA), (vi) asking the user to confirm that the user is not a robot, (vii) invoking an invisible CAPTCHA when the user clicks on an existing button, (viii) invoking a CAPTCHA which returns a score for each request, or (ix) asking the user to provide one or more answers to one or more security questions.

18. A system comprising one or more processors and one or more non-transitory storage media storing instructions that, when executed by the one or more processors, cause the one or more processors to perform operations for enhancing security controls of a web application, the operations comprising:
in response to a request of a user device to access the web application during a current user session, collecting, by a server system, authentication data of a user of the user device from a client system, the client system comprising the user device and an identity provider;
authenticating, by the server system, an identity of the user based on the collected authentication data;
generating, for the current user session, a user risk profile that characterizes a level of risk that the identity of the user will be compromised;
after the user risk profile has been generated for the current user session, authorizing the user device to access the web application;
detecting that the user is attempting a particular action on the web application;
generating an action risk profile for the particular action and a client risk profile for the client system;
in response to the detection of the particular action, determining whether a step-up authentication is required based on (i) the user risk profile generated for the current user session, (ii) the action risk profile generated for the particular action, and (iii) the client risk profile generated for the client system;
in response to a determination that the step-up authentication is required, dynamically selecting, based on the generated user risk profile, a step-up authentication method for re-authenticating the identity of the user; and providing one or more security requests defined by the selected step-up authentication method to the user device.

\* \* \* \* \*